April 6, 1965
C. POTTER ETAL
3,177,057
METHOD OF FORMING QUARTZ FIBERS FROM EXTRUDED RODS
Filed Aug. 2, 1961
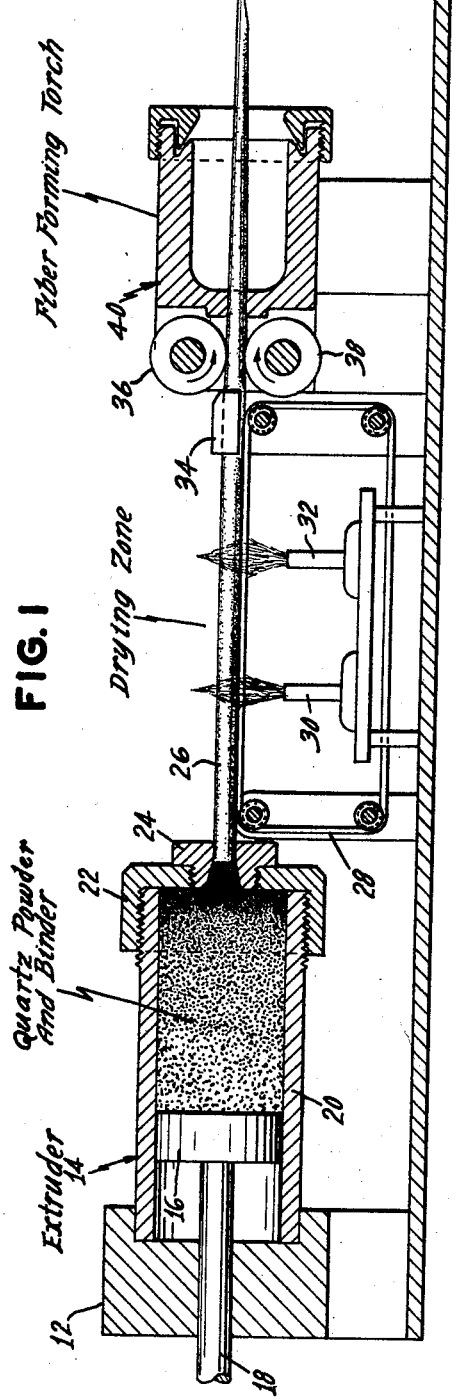
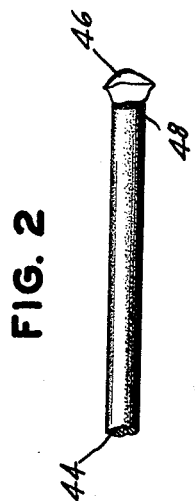
FIG. 2
INVENTORS
CHARLES POTTER
JOHN W. LINDENTHAL
BY
Karl Hahn
James E. Bryan
Alan C. Rose
ATTORNEYS

United States Patent Office 3,177,057
Patented Apr. 6, 1965

3,177,057
METHOD OF FORMING QUARTZ FIBERS
FROM EXTRUDED RODS
Charles Potter, South Orange, and John W. Lindenthal, Hazlet, N.J., assignors to Engelhard Industries, Inc., Newark, N.J., a corporation of Delaware
Filed Aug. 2, 1961, Ser. No. 129,502
6 Claims. (Cl. 65—7)

This invention relates to a method and apparatus for forming bonded silica rods and for forming quartz fibers.

This is a continuation-in-part application of our copending application Serial No. 850,573, filed November 3, 1959, now abandoned.

In the production of pure silica fibers, it has been proposed to use a pure fused quartz rod to feed the rod through a special type of torch. One suitable apparatus for this purpose is disclosed in C. Potter patent application No. 803,928, filed April 3, 1959, and entitled "Fiber Forming Torch," now U.S. Patent 3,045,278.

Up to the present time, the manufacture of pure fused quartz fibers has been a difficult and expensive operation. The problems associated with the manufacturing of quartz fibers are principally a result of the high melting point of quartz, which is about 1700 or 1800° C., and above 3,000° F. Thus, in making quartz fibers, using the fiber-forming torch process, fused quartz rods were initially formed from the quartz powder or sand form in which the raw material is available. This step requires the application of heat to raise the crystalline quartz powder or sand up to its melting point. Thus, in the formation of quartz fibers, the quartz must be raised to this very high temperature twice. These two heating steps and the associated manufacturing procedures have made the formation of quartz fibers both time-consuming and expensive. Further, applicants found this first heating step to raise the quartz powder up to its melting point to be disadvantageous for the reason that it burned out the organic binder typically used to form the self-sustaining rod upon extrusion, and this burning out of the binder resulted in deterioration and crumbling of the rod. The result was that there was no satisfactory rod available for the formation of the fibers.

Principal objects of the present invention are the simplification and reduction in cost of processes and apparatus for forming quartz fibers.

In accordance with the present invention, an economical and commercially practicable method is provided for forming quartz fibers which eliminates the requirement of the first heating step of the prior art for forming the quartz powder or sand into rods, the method involving the combination of steps of intimately mixing together the powdered pure or substantially pure silica, a liquid binder composition comprising from about 1–50 percent by weight of a binding agent, and an extruding agent, extruding the mixture into a rod and avoiding heating the mixture to high temperatures during and after the extruding except for a fiber-forming step hereafter described, and drying the extruded rod either at room temperature or at a relatively low temperature below 150° C. Thereafter the rod is passed into a fiber-forming torch having an operating temperature above 1700° C. to form the fibers. The method is a considerable improvement by reason of providing the following: (1) considerable reduction in the cost of manufacture of the quartz fibers because eliminating the considerable requirements of fuel and the apparatus required for the first heating step of the prior art; (2) avoids burning out the organic binder with attendant deterioration and crumbling of the rod and hence the desired rod is available for the subsequent formation of fibers; and (3) simplification and efficiency in operation.

The fibers are preferably formed by passing the self-sustaining rod through the aforementioned fiber-forming torch wherein a forceful annular or sleeve-like gas jet at a pressure of from 10 to 150 pounds per square inch is applied onto the molten peripheral surface of an end portion of the rod, the rod having been previously heated in the torch to a temperature below its melting point and the silica at the surface of the end portion of the rod previously melted by application thereto of the torch flame having a temperature above the melting point of the silica. The gas of this annular or sleeve-like jet is typically air or steam. Such a fiber-forming operation is disclosed and claimed in previously mentioned co-pending application Serial No. 803,928, now U.S. Patent 3,045,278. Formation of the fibers by means of this application of the annular or sleeve-like forceful gas jet is preferred for the reasons: (1) considerably increased rate of production of the fibers is achieved; (2) increased heat transfer efficiency is achieved; (3) the high velocity gas jet produces an aspirating suction effect in the torch, which draws the flame and combustion products along the quartz rod to keep the molten quartz hot as the fibers are drawn off; and (4) the flame and hot combustion products are drawn out of the combustion chamber and away from its wall so that these walls are not heated unduly.

The extruding agent is added to the powdered silica either prior to or after the addition of the liquid binder composition in a minor amount, preferably from about 0.1–10 percent by weight (based on weight of $SiO_2$), which is sufficient to impart extrudability to the composition. Extruding agents which can be employed include alginic acid, sodium alginate, ammonium alginate, polyvinyl alcohol. When polyvinyl alcohol is employed as binder, it is unnecessary to add additional extruding agent, provided a sufficient amount of polyvinyl alcohol is added, as a minor portion of the polyvinyl alcohol will also function as the extruding agent. The use of the extruding agent is essential in this invention to achieve good extrusions of silica in the form of the rods, the extruding agent serving to "lubricate" the silica particles to enable the discrete particles to pass or slip by one another during the extruding operation to form the self-sustaining rod. The extruding agent is preferably added to the composition when dissolved in a suitable liquid solvent, for instance an organic liquid solvent, e.g. alcohol, glycerine, ether, $CCl_4$ or water in the case of polyvinyl alcohol.

The binder composition of this invention comprises broadly from about 1–50 weight percent (based on total composition) of a binding agent, in solution in a suitable liquid solvent or dispersed as a colloidal suspension in water in the case of colloidal silica. Examples of the binding agent are silica gel or amorphous silica, cellulose acetate, a water-soluble wax, polyvinyl alcohol or hydrolyzed ethyl silicate. An especially suitable water-soluble wax is one marketed under the trademark name "Carbowax." When using a liquid binder composition containing an organic binding agent, the composition will broadly comprise from about 1–50 weight percent (based on total composition) of the organic binding agent such as one of the organic binding agents previously disclosed, in solution in organic liquid solvent or water, which solvent usually makes up the balance. The preferred proportion of organic binding agent will, of course, depend on the particular binding agent employed. With use of an organic binding composition containing polyvinyl alcohol as the binder component, this composition will preferably contain from about 1–10 weight percent of the polyvinyl alcohol in solution in water, the water making up the balance of the composition, i.e. being present in amount from about 99–90 weight percent.

When the organic binder is a water-soluble wax, the binder composition will preferably contain from about 1–30 weight percent of the water-soluble wax and from about 99–70 weight percent of water. When the organic binder is cellulose acetate, the composition will preferably comprise from about 1–25 weight percent of cellulose acetate and from about 99–75 weight percent of organic liquid solvent, for instance chloroform or glacial acetic acid. When a colloidal suspension of amorphous silica is employed as the binder composition, the composition will preferably comprise from about 1–30 weight percent of the amorphous silica and from about 99–70 weight percent of water. When the binder is hydrolyzed ethyl silicate, the binder composition will preferably comprise from about 25–75 weight percent of the ethyl silicate in solution in water, the water making up the balance, i.e. being present in amount of from about 75–25 weight percent. The liquid binder composition is preferably added to the powdered silica in amount of from about 0.1–25 weight percent, more preferably from about 5–10 weight percent (based on weight of $SiO_2$).

In accordance with a featured apparatus of this invention, an extruder is provided for forming rods of silica powder mixed with the binder composition. In addition, drying apparatus is provided for strengthening the extruded rods prior to their application to a quartz rod fiber-forming torch. The rods may be conveyed from the extruder through the drying apparatus to the fiber-forming torch by any suitable apparatus, such as a wire conveyor belt, for example. If the drying zone is sufficiently long, no external heat is required; with a short drying zone however, supplemental low temperature heating may advantageously be employed.

In accordance with additional features of the invention, the silica is preferably pure or substantially pure crystalline silica, and the binder preferably comprises amorphous silica in colloidal form.

The principal advantage of the method and apparatus described above lies in the elimination of one of the two heating steps previously required in the formation of quartz fibers. Thus, it is no longer necessary to heat the quartz powder up to the intense heat required to form the silica rods; instead the powdered silica is merely bonded to form a relatively low strength rod, which does, however, have sufficient strength for application to a fiber-forming torch.

Other objects, features and advantages of the invention may be readily apprehended from a consideration of the following detailed description and from the drawing, in which:

FIG. 1 is a schematic showing of the apparatus in accordance with the present invention, and FIG. 2 is an enlarged view of a piece of bonded quartz powder rod which was removed from the fiber-forming torch after the process was stopped.

Referring to the drawings, FIG. 1 shows a heavy collar 12 to which an extruder 14 is secured. The extruder 14 includes a piston 16 and a piston rod 18 in addition to a main chamber 20. The front of the main chamber 20 is closed by a screw-threaded cap 22 and a die 24. The die 24 is threaded into the front of the cap 22 for ease in removal or substitution. As the piston rod 18 is slowly advanced by a hydraulic system (not shown), quartz powder together with the binding agent and a suitable extruding agent is forced through the opening in the die 24. The resulting rod 26 is slowly advanced by the pressure from the extruding head and by a synchronized wire conveyor belt 28.

In one embodiment of the invention, the diameter of the extruder chamber 20 was approximately equal to one inch, and the diameter of the opening in the die 24 was equal to 3/16".

The wire conveyor belt 28 carries the extruded rod 26 through a drying zone. The drying zone may be provided with suitable arrangements such as the Bunsen burners 30 and 32 for applying some heat to the rod 26. Any other suitable apparatus such as a conventional infrared lamp, a vacuum drying apparatus, or a perforate tube heated with resistance wires, may be employed instead of the Bunsen burners. Extruded rods which have merely been air-dried have also been employed successfully. Suitable guides 34 direct the rod 26 from the drying zone into the space between the feed rollers 36 and 38 associated with the fiber-forming torch 40.

The fiber-forming torch 40 may take any one of a number of known forms. Thus, it may be in one of the forms shown in application Serial No. 803,928 cited above. Alternatively, commercial metallizing guns of certain recent designs which are capable of producing temperatures above 1700 or 1800° C. and of accepting rods of the proper diameter may be employed.

A relatively slow feed is employed for the piston rod 18 and also for the extruded rod 26. Thus, for example, with a rod of 3/16" diameter, the rate of feed through the fiber-forming torch 40 would be in the order of about several feet per hour up to about 10 to 15 feet per hour. The rate may vary with the diameter of rod which is used; in general, the weight of quartz fiber which is formed varies from several ounces to about two pounds per hour.

As mentioned above, the bonded rod is of about the same consistency and strength as blackboard chalk. It may be readily broken using two fingers of each hand. With reference to FIG. 2, a rod is shown which is broken at the left-hand end 44. The other end 46 was near the output end of the fiber-forming torch when the process was stopped. The white end portion of the rod is pure fused silica, as the binder materials are burned off by the high temperature within the torch. Immediately behind the fused zone at the end of the rod of FIG. 2, there is a black zone 48. In this region, the impurities are being burned out, and the black ring represents residual carbonized impurities.

*Example I*

A typical extruding batch consisted of 25 grams of Brazilian quartz crystal ground to −100 mesh size, 25 grams pure quartz sand of −140 mesh size, 12 ml. of a water suspension of amorphous silica supplied by Du Pont and known as Ludox AS. In addition, 1.25 grams of alginic acid were added as an extruding agent. With regard to the composition of the water suspension of amorphous silica, the silica forms 30 percent by weight of the solution. The particles of silica are approximately 15 millimicrons in diameter.

The designation −100 mesh size or −140 mesh size means that the powder has passed through a screen of 100 mesh or 140 mesh size, respectively.

The silica powders were weighed out to the nearest tenth of a gram and placed in a 250 ml. beaker. The alginic acid was weighed to the nearest 1/100 of a gram and added to the quartz powder in the beaker. These compounds were mixed by blending the alginate in with a glass rod. Following this operation, the water suspension of amorphous silica was added slowly, one or two cubic centimeters at a time, with each addition being stirred in well before the introduction of additional liquid until the liquid was uniformly distributed and no lumps were present. The mixture was then placed in the cylinder of the extruder, and the cap and die were assembled in place. Pressure was applied to the piston, and a rod of 3/16" diameter was extruded. When rods were permitted to dry in the air at room temperature, they could be handled after about two hours. When drying was performed at 110° C., strength was developed within 30 minutes. By the use of slightly higher temperatures provided by a Bunsen burner, continuous processes may be accommodated.

*Example II*

In accordance with an alternative arrangement, 220 grams of crystalline quartz finely ground in a ball mill are mixed with 80 cubic centimeters of water to form a suspension. The powdered silica is of such fineness that 98 percent passed through a 325 mesh screen. Small quantities of a binder and a flocculating agent are then added. Specifically, 0.3 gram of ammonium nitrate are added as a flocculating agent and 4 grams of polyvinyl alcohol are added as a binder to impart strength to the extruded rods.

The mass is then subjected to a wedging operation to remove some of the moisture. Specifically, the plastic mass is repeatedly brought into contact with material which absorbs the excess surface moisture.

The process was then carried forward through the extruding, drying and fiber-forming processes as discussed above.

Variants of Examples I and II

With regard to the ingredients which are to be extruded, the silica powder must be pure or substantially pure in order to produce pure silica fibers. Ground Brazilian quartz crystal is ideal for the purpose, and the quartz powder employed in the process may be entirely derived from this material. It may be initially broken up by a quenching process, and ground into a fine powder in a conventional ball mill. Sufficiently pure silica powder is available from a number of sources. In addition to the use of powder derived from Brazilian quartz crystal, high purity silica sand and flint are available from a number of commercial sources. Ground up fused quartz and other forms of $SiO_2$ may also be used either by itself or in any combination with silica from other sources. When the word "silica" is employed in the present specification and claims, it is understood that all of these forms of silica are included.

By the term "substantially pure" silica used herein is meant a high purity silica having a silica content of 96 percent or higher. By the term "binding agent" used herein is meant a material or substance which, when added to the silica prior to extruding same, will function to hold the silica particles together after extrusion as a self-sustaining rod. Examples of binding agents suitable for use in this invention have been previously disclosed herein. By the term "extruding agent" used herein is meant a material or substance which, when added to the silica prior to the extruding step, will serve to lubricate the silica particles sufficiently to enable the silica particles to pass or slip by one another during the extruding through the die opening in a fashion to form the desired rod extrusion. Examples of suitable extruding agent for use herein are previously disclosed herein.

Concerning the size of the particles in the silica powder which is employed, it is desirable that the powder pass through a 100 mesh screen. Improved results are obtained with finer powder. For example, the finest mesh screens which are commonly made are 325 mesh. Particularly good results were obtained with two samples of silica powder in which 90 percent and 96 percent, respectively, passed through a 325 mesh screen.

With regard to the binding agent, it is desirable to employ either a form of amorphous silica, which will not introduce any significant impurities, or a substance which will burn off in the fiber-forming torch. Amorphous silica, or silica gel, in a water suspension is to be preferred. It is noted that hydrolyzed ethyl silicate could also be used. In the case of Example II, the flocculating agent could be ammonium carbonate as well as ammonium nitrate, and a water soluble wax could be used as a binder instead of polyvinyl alcohol.

As noted above, 1.25 grams of alginic acid were added as an extruding agent in Example I. Other extruding agents which could be employed include sodium alginate, ammonium alginate and polyvinyl alcohol. Other known extruding agents may also be employed. In many cases a separate extruding agent is not required, and the binder or water with which the silica is mixed serves this purpose.

With regard to the proportions of the various ingredients which may be used, it may be noted that Example I disclosed 50 grams of silica powder, 12 milliliters of liquid binder, and 1.25 grams of an extruding agent. The percentage of liquid binder was about 24 percent by weight of the silica powder and the percentage of extruding agent was about 2.5 per cent by weight of the silica powder. When a separate extruding agent is used, it should generally be in an amount less than 5 percent of the mixture to be extruded. Using the specific liquid binder mentioned under Example I, the percentage could be varied from about fifteen to thirty-five percent. Below ten percent, the mix will not extrude readily, and above thirty-five percent, the mix becomes too liquid to form a self-sustaining rod. With a binder of somewhat lower viscosity, the percentages would be shifted down to some extent; and with a liquid binder of increased viscosity, somewhat more of the binder would advantageously be employed.

In the foregoing examples, reference has been made to the use of pure silica to form pure fused silica fibers. In some cases, however, it may be desirable to obtain silica fibers having some impurities. In this regard, it is contemplated that slight additions of other materials which could for example form other glassy substances may be employed in the present process. Boric acids, $B_2O_3$, is one such impurity, and it could be introduced into the mixture to be extruded, as boric acid. The use of slightly impure silica sand could also produce this result.

It is again noted that a principal advantage of the invention results from the direct formation of pure silica fibers from crystalline quartz powder bonded into a rod. Through the use of this technique, the silica need be raised to its high melting point but once. Furthermore, this method overcomes the dual problems of (1) sizing the crystalline quartz for use in a fiber-forming gun and (2) the weakness inherent in the discontinuous temperature-expansion characteristic of crystalline silica.

While the present invention is primarily directed to the production of fused quartz fibers, as noted above, significant impurities or additions may be present in the silica. Under these conditions, the melting point of the bonded rod may be reduced from the 1700° C. to 1800° C. level mentioned above by two or three hundred degrees, for example. In all events, the temperature provided by the fiber-forming torch only needs to be somewhat higher than the melting point of the impure silica.

It is to be understood that the above described arrangements are illustrative of the application of the principles of the invention. Numerous other arrangements may be devised by those skilled in the art without departing from the spirit and scope of the invention.

What is claimed is:

1. A method for forming fused quartz fibers, which comprises mixing together powdered substantially pure silica, from about 0.1–25 weight percent based on the weight of $SiO_2$ of a liquid binder composition comprising from about 1–50 weight percent of an organic binding agent, and a minor amount sufficient to impart extrudability to the resulting mixture of an extruding agent, extruding the mixture into a self-sustaining rod and avoiding heating the mixture to high temperatures sufficiently high to burn out the organic binding agent during and after the extruding except for a fiber-forming step hereafter described thereby avoiding burning out the organic binding agent from the mixture with attendant deterioration of the rod prior to the fiber-forming, drying the extruded self-sustaining rod at a temperature within the range of from room temperature to up to but below 150° C., and passing the rod into a fiber-forming torch having an operating temperature above 1800° C. thereby forming the fused quartz fibers.

2. A method for forming fused quartz fibers which comprises adding to powdered substantially pure crystalline silica from about 5–10 weight percent based on weight of SiO$_2$ of a liquid binder composition comprising from about 1–50 weight percent of an organic binding agent in solution in from about 99–50 weight percent liquid solvent, adding from about 0.1–10 weight percent based on weight of SiO$_2$ of an organic extruding agent to the powdered silica, intimately mixing the powdered silica, binder composition and extruding agent, extruding the mixture into a self-sustaining rod and avoiding heating the mixture to high temperatures sufficiently high to burn out the organic binding agent during and after the extruding except for a fiber-forming step hereafter described thereby avoiding burning out the organic binding agent from the mixture with attendant deterioration of the rod prior to the fiber forming, drying the extruded self-sustaining rod at a temperature within the range of from room temperature to up to but below 150° C., and passing the rod through a fiber-forming torch having an operating temperature of above 1800° C. wherein a forceful sleeve-like gas jet at a pressure of from 10 to 150 pounds per square inch is directed from the torch onto the molten peripheral surface of an end portion of the rod, which surface of the end portion of the rod has been previously heated in the torch to a temperature above its melting point by application of the torch flame thereto to melt the silica at the surface of the rod end portion, thereby forming the fused quartz fibers.

3. A method in accordance with claim 2 wherein the binder composition comprises from about 1–30 weight percent of a water-soluble wax in solution in from about 99–70 weight percent water.

4. A method in accordance with claim 2 wherein the binder composition comprises from about 1–10 weight percent of polyvinyl alcohol in solution in from about 99–90 weight percent of water.

5. A method in accordance with claim 2 wherein the binder composition comprises from about 1–25 weight percent cellulose acetate in solution in from about 99–75 weight percent of an organic liquid solvent therefor.

6. A method for forming fused quartz fibers, which comprises mixing together powdered substantially pure crystalline silica and water to form a suspension, adding to the suspension from about 0.1–5 weight percent based on SiO$_2$ of a liquid binder composition comprising from about .1–25 weight percent of an organic binding agent, adding from about 0.1–5 weight percent based on SiO$_2$ of an organic extruding agent to the suspension, adding a flocculating agent to the suspension to change the suspension to a plastic mass, extruding the plastic mass to form a self-sustaining rod and avoiding heating the mass to high temperature sufficiently high to burn out the organic binding agent during and after the extruding except for a fiber-forming step hereafter described thereby avoiding burning out the organic binding agent from the mixture with attendant deterioration of the rod prior to the fiber forming, drying the extruded rod at a temperature within the range of from room temperature to up to but below 150° C., and passing the rod through a fiber-forming torch having an operating temperature of above 1800° C. wherein a forceful sleeve-like gas jet at a pressure of from 10 to 150 pounds per square inch is directed from the torch onto the molten peripheral surface of an end portion of the rod, which surface of the end portion of the rod has been previously heated in the torch to a temperature above its melting point by application of the torch flame thereto to melt the silica at the rod end portion, thereby forming the fused quartz fibers.

References Cited by the Examiner
UNITED STATES PATENTS

| | | | |
|---|---|---|---|
| 2,566,252 | 8/51 | Tooley et al. | 65—227 |
| 2,724,866 | 11/55 | Stephens | 65—7 |
| 2,822,579 | 2/58 | Silverman | 65—7 |
| 2,838,882 | 6/58 | Silverman | 65—7 |
| 2,984,868 | 5/61 | Hill | 65—7 |

DONALL H. SYLVESTER, *Primary Examiner.*

WILLIAM J. STEPHENSON, *Examiner.*